(12) United States Patent
Boul et al.

(10) Patent No.: US 9,988,306 B2
(45) Date of Patent: Jun. 5, 2018

(54) ACTIVATION OF SET-DELAYED CEMENT COMPOSITIONS BY RETARDER EXCHANGE

(71) Applicant: Halliburton Energy Services, Inc., Houston, TX (US)

(72) Inventors: Peter James Boul, Houston, TX (US); Xueyu Pang, Houston, TX (US); Pinmanee Boontheung, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 14 days.

(21) Appl. No.: 14/910,867

(22) PCT Filed: Oct. 31, 2013

(86) PCT No.: PCT/US2013/067702
§ 371 (c)(1),
(2) Date: Feb. 8, 2016

(87) PCT Pub. No.: WO2015/034543
PCT Pub. Date: Mar. 12, 2015

(65) Prior Publication Data
US 2016/0194244 A1 Jul. 7, 2016

Related U.S. Application Data

(60) Provisional application No. 61/875,398, filed on Sep. 9, 2013.

(51) Int. Cl.
E21B 33/13 (2006.01)
E21B 33/14 (2006.01)
(Continued)

(52) U.S. Cl.
CPC .............. *C04B 7/02* (2013.01); *C04B 28/02* (2013.01); *C04B 40/0658* (2013.01); *C09K 8/467* (2013.01); *E21B 33/14* (2013.01)

(58) Field of Classification Search
CPC ......... E21B 33/13; E21B 33/14; C09K 8/467; C04B 22/16; C04B 24/003; C04B 24/04; C04B 24/20
See application file for complete search history.

(56) References Cited

U.S. PATENT DOCUMENTS 3,557,876 A   1/1971   Tragesser
3,887,009 A   6/1975   Miller et al.
(Continued)

FOREIGN PATENT DOCUMENTS

EP   0177308       8/1991
WO   1996020899    7/1996

OTHER PUBLICATIONS

International Search Report and Written Opinion for International Application No. PCT/US2013/067702 dated Oct. 31, 2013.
(Continued)

*Primary Examiner* — Catherine Loikith
(74) *Attorney, Agent, or Firm* — Craig W. Roddy; Tumey L.L.P.

(57) ABSTRACT

A variety of methods and compositions for cementing with set-delayed cement. In one embodiment a method comprises providing a set-delayed cement composition comprising a hydraulic cement, water, and a primary retarder. The method further comprises activating the set-delayed cement composition through a retarder exchange whereby, a secondary retarder is added to the set-delayed cement composition to produce an activated cement composition. The activated cement composition is then allowed to set.

20 Claims, 11 Drawing Sheets

(51) Int. Cl.
*C09K 8/467* (2006.01)
*C04B 22/16* (2006.01)
*C04B 7/02* (2006.01)
*C04B 28/02* (2006.01)
*C04B 40/06* (2006.01)

(56) References Cited

U.S. PATENT DOCUMENTS

| | | |
|---|---|---|
| 3,959,003 A | 5/1976 | Ostroot et al. |
| 4,158,570 A | 6/1979 | Irwin |
| 4,462,837 A | 7/1984 | Baker et al. |
| 4,515,216 A | 5/1985 | Childs et al. |
| 4,519,452 A | 5/1985 | Tsao et al. |
| 4,524,828 A | 6/1985 | Sabins et al. |
| 4,676,832 A | 6/1987 | Childs et al. |
| 4,818,288 A | 4/1989 | Aignesberger et al. |
| 5,058,979 A | 10/1991 | Hale et al. |
| 5,263,542 A | 11/1993 | Brothers |
| 5,366,547 A | 11/1994 | Brabston et al. |
| 5,447,197 A | 9/1995 | Rae et al. |
| 5,547,506 A | 8/1996 | Rae et al. |
| 5,553,670 A | 9/1996 | Cowan |
| 6,279,655 B1 | 8/2001 | Pafitis et al. |
| 6,457,523 B1 | 10/2002 | Vijn et al. |
| 6,610,140 B2 | 8/2003 | Vijn et al. |
| 6,907,928 B2 | 6/2005 | Di Lullo Arias et al. |
| 6,908,508 B2 | 6/2005 | Brothers |
| 7,086,466 B2 | 8/2006 | Roddy et al. |
| 7,199,086 B1 | 4/2007 | Roddy et al. |
| 7,201,798 B2 | 4/2007 | Brothers et al. |
| 7,204,307 B2 | 4/2007 | Roddy et al. |
| 7,284,611 B2 | 10/2007 | Reddy et al. |
| 7,338,923 B2 | 3/2008 | Roddy et al. |
| 7,478,675 B2 | 1/2009 | Roddy et al. |
| 7,559,369 B2 | 7/2009 | Roddy et al. |
| 7,575,055 B2 | 8/2009 | Reddy et al. |
| 7,617,870 B1 | 11/2009 | Roddy et al. |
| 7,631,692 B2 | 12/2009 | Roddy et al. |
| 7,670,427 B2 | 3/2010 | Perez-Pena |
| 7,674,332 B2 | 3/2010 | Roddy et al. |
| 7,743,828 B2 | 6/2010 | Roddy et al. |
| 7,757,765 B2 | 7/2010 | Hilleary et al. |
| 7,784,542 B2 | 8/2010 | Roddy et al. |
| 7,789,150 B2 | 9/2010 | Roddy et al. |
| 7,806,183 B2 | 10/2010 | Roddy et al. |
| 7,836,954 B2 | 11/2010 | Morgan et al. |
| 7,855,170 B2 | 12/2010 | Perera et al. |
| 7,863,224 B2 | 1/2011 | Keys et al. |
| 7,867,954 B2 | 1/2011 | Warrender et al. |
| 7,892,352 B2 | 2/2011 | Roddy et al. |
| 7,964,538 B2 | 6/2011 | Perera et al. |
| 8,038,790 B1 | 10/2011 | Dubey et al. |
| 8,183,186 B2 | 5/2012 | Luo |
| 8,297,357 B2 | 10/2012 | Brenneis et al. |
| 8,307,899 B2 | 11/2012 | Brenneis et al. |
| 8,403,045 B2 | 3/2013 | Brenneis et al. |
| 8,476,203 B2 | 7/2013 | Patil |
| 8,486,869 B2 | 7/2013 | Brenneis et al. |
| 8,492,317 B2 | 7/2013 | Chatterji et al. |
| 8,505,630 B2 | 8/2013 | Chatterji et al. |
| 8,586,512 B2 | 11/2013 | Roddy et al. |
| 8,603,952 B2 | 12/2013 | Roddy et al. |
| 8,623,794 B2 | 1/2014 | Chatterji et al. |
| 8,685,903 B2 | 4/2014 | Ravi et al. |
| 8,741,818 B2 | 6/2014 | Ravi et al. |
| 8,851,173 B2 | 10/2014 | Brothers et al. |
| 8,899,329 B2 | 12/2014 | Chatterji et al. |
| 8,910,708 B2 | 12/2014 | Chatterji et al. |
| 8,940,670 B2 | 1/2015 | Patil et al. |
| 9,018,147 B2 | 4/2015 | Luo et al. |
| 9,199,879 B2 | 12/2015 | Thaemilitz et al. |
| 9,206,344 B2 | 12/2015 | Roddy et al. |
| 9,212,534 B2 | 12/2015 | Ballew et al. |
| 2004/0211342 A1 | 10/2004 | Sprouts et al. |
| 2006/0166834 A1 | 7/2006 | Roddy et al. |
| 2009/0124522 A1 | 5/2009 | Roddy et al. |
| 2010/0041792 A1 | 2/2010 | Roddy et al. |
| 2010/0044043 A1 | 2/2010 | Roddy et al. |
| 2010/0240556 A1 | 9/2010 | Keys et al. |
| 2010/0258312 A1 | 10/2010 | Brenneis et al. |
| 2010/0273812 A1 | 10/2010 | Roddy et al. |
| 2010/0028466 A1 | 11/2010 | Brenneis et al. |
| 2011/0132605 A1 | 6/2011 | Sarap et al. |
| 2011/0162845 A1 | 7/2011 | Ravi et al. |
| 2012/0214901 A1 | 8/2012 | Bury et al. |
| 2013/0248183 A1* | 9/2013 | Pisklak ............... C09K 8/428 166/292 |
| 2014/0000893 A1 | 1/2014 | Lewis et al. |
| 2014/0020895 A1 | 1/2014 | Agapiou et al. |
| 2014/0034313 A1 | 2/2014 | Pisklak et al. |
| 2014/0034314 A1 | 2/2014 | Lewis et al. |
| 2014/0048267 A1 | 2/2014 | Pisklak et al. |
| 2014/0083701 A1 | 3/2014 | Boul et al. |
| 2014/0174741 A1 | 6/2014 | Agapiou et al. |
| 2014/0190696 A1 | 7/2014 | Iverson et al. |
| 2014/0202698 A1 | 7/2014 | Pisklak et al. |
| 2014/0318417 A1 | 10/2014 | Chatterji et al. |

OTHER PUBLICATIONS

Dequest 2006 Information Sheet dated Mar. 25, 2013.
Dequest 2066 Information Sheet dated 2013.
Liquiment Dispersant Information Sheet dated 2013.
Halliburton Energy Services CFR-3 cement friction reducer dispersant dated Oct. 2005.
Ramachandra, V.S.; Lowery, M.S. "Conduction calorimetric investigation of the effect of retarders on the hydration of Portland cement." Thermochimica Acta, 1992, 195, 373-387.
Benge et al., "Deep Gas-Well Cementation: A review of Risks and Design Basis for Use of Liquid Cement Premix for Large Offshore Cementing Operations", IADC/SPE 98970, pp. 1-5, ISDC/SPE Drilling Conference, 2006.
Rae et al., "Liquid Cement Premix Introduces new Solutions to Conventional Cementing Problems". IADC/SPE 35086, pp. 393-400, IADC/SPE Drilling Confrence, 1996.
Rae et al., "Liquid Cement Premix for Improved Abandonment and Workover Operationas", SPE 36477, pp. 637-643, SPE, Inc., 1996.
Anderson et al., "New Technology Eliminates Bulking in Cementing Operations", SPE 36478, pp. 645-653,SPE, Inc., 1996.
Shaefer et al., "Utilizing 'Over-Seas' Technology Improves the Cementing Processes in the DJ Basin of Colorado", SPE 80940, pp. 1-8, SPE, Inc. 2003.
Liquidstone Cement Technology, Product Sales Bulletin, BJ Services Company, pp. 1-2, Oct. 19, 2004.
International Search Report and Written Opinion for International Application No. PCT/US2013/029489 dated Apr. 19, 2013.
Benge, O.G. et al., "Evaluation of Blast Furnace Slag Slurry for Oilfield Application" SPE 27449, pp. 169-180, SPE Inc., 1994.
Allahverdi, A. et al., (2006). "Chemical activation and set acceleration of lime-natural pozzolan cement." Ceramics—Silikaty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Materials, 11(4), 191-209.

(56) References Cited

OTHER PUBLICATIONS

Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
Ramy N.Eid, Liquid Cement: Changing the Paradigm, Society of Petroleum Engineers, Apr. 15, 2007.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.

\* cited by examiner

ACTIVATION OF SET-DELAYED CEMENT COMPOSITIONS BY RETARDER EXCHANGE

BACKGROUND

The present embodiments relate to subterranean cementing operations and, in certain embodiments, to set-delayed cement compositions and methods of using set-delayed cement compositions in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string prevents the migration of fluids in the annulus and protects the pipe string from corrosion. Cement compositions may also be used in remedial cementing methods to seal cracks or holes in pipe strings or cement sheaths, to seal highly permeable formation zones or fractures, or to place a cement plug and the like.

A broad variety of cement compositions have been used in subterranean cementing operations. In some instances, set-delayed cement compositions have been used. Set-delayed cement compositions are characterized by remaining in a pumpable fluid state for at least about one day (e.g., about 7 days, about 2 weeks, about 2 years or more) at ambient temperature (e.g., about 80° F.) in quiescent storage. When desired for use, the set-delayed cement compositions should be capable of activation and consequently develop reasonable compressive strengths. Among other things, set-delayed cement compositions may be suitable for use in wellbore applications such as applications where it is desirable to prepare the cement composition in advance. This may allow the cement composition to be stored prior to use. In addition, this may allow the cement composition to be prepared at a convenient location before transportation to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed compositions comprising hydrated lime and quartz, may be effective in some operations but may have limited use at lower temperatures as they may not develop sufficient compressive strength when used in subterranean formations having lower bottom hole static temperatures. In addition, it may be problematic to activate some set-delayed cement compositions while maintaining acceptable thickening times and compressive strength development.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1A:
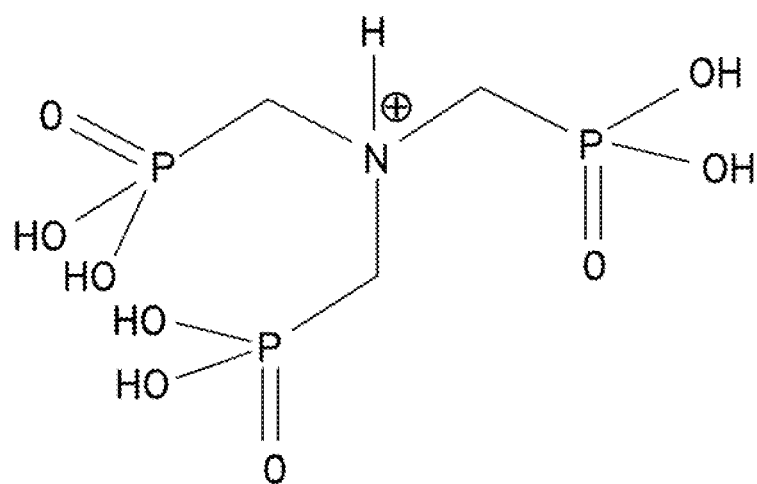
FIG. 1A illustrates the chemical structure of nitrilotris (methylene) triphosphonate (NTMP)

The example embodiments relate to subterranean cementing operations and, in certain embodiments, to set-delayed cement compositions and methods of using set-delayed cement compositions in subterranean formations.

Embodiments of the set-delayed cement compositions may generally comprise water, hydraulic cement, and a set retarder. Optionally, the set-delayed cement compositions may further comprise a dispersant. Advantageously, embodiments of the set-delayed cement compositions may be capable of remaining in a pumpable fluid state for an extended period of time. For example, the set-delayed cement compositions may remain in a pumpable fluid state for at least about 1 day or longer. These compositions may be used at temperatures as low as 80° F. or lower and as high as 300° F. or higher.

Embodiments may comprise any of a variety of hydraulic cements suitable for use in subterranean cementing operations. Examples include hydraulic cements that comprise calcium, aluminum, silicon, oxygen, and/or sulfur, and which set and harden by reaction with water. Such hydraulic cements, include, but are not limited to, Portland cements, pozzolan cements, gypsum cements, high-alumina-content cements, slag cements, silica cements, and combinations thereof. In certain embodiments, the hydraulic cement may comprise a Portland cement. In some embodiments, the Portland cement may be classified as Class A, C, H, or G cement according to the American Petroleum Institute, *API Specification for Materials and Testing for Well Cements*, API Specification 10, Fifth Ed., Jul. 1, 1990. In addition, in some embodiments, the hydraulic cement may include cements classified as ASTM Type I, II, or III.

The water used in embodiments may be from any source provided that it does not contain an excess of compounds that may undesirably affect other components in the set-delayed cement compositions. For example, a cement composition may comprise fresh water or salt water. Salt water generally may include one or more dissolved salts therein and may be saturated or unsaturated as desired for a particular application. Seawater or brines may be suitable for use in embodiments. Furthermore, the water may be present in an amount sufficient to form a pumpable slurry. In certain embodiments, the water may be present in the set-delayed cement compositions in an amount in the range of from about 33% to about 200% by weight of the hydraulic cement. In certain embodiments, the water may be present in the set-delayed cement compositions in an amount in the range of from about 35% to about 70% by weight of the hydraulic cement. With the benefit of this disclosure one of ordinary skill in the art will recognize the appropriate amount of water for a chosen application.

Optional embodiments of the set-delayed cement compositions may comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the set-delayed cement compositions, for example, to form a hydraulic composition with certain hydraulic cements disclosed above. For example, the hydrated lime may be included in a hydraulic cement-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the hydraulic cement, for example. In some embodiments, the hydrated lime may be present in an amount ranging between any of and/or including any of about 10%, about 20%, about 40%, about 60%, about 80%, or about 100% by weight of the hydraulic cement. In some embodiments, the cementitious components present in the set-delayed cement composition may consist essentially of the hydraulic cement and the hydrated lime. For example, the cementitious components may primarily comprise the hydraulic cement and the hydrated lime without any additional components that hydraulically set in the presence of water. One of ordinary skill in the art, with the benefit of this disclosure, will recognize the appropriate amount of the hydrated lime to include for a chosen application.

Embodiments of the set-delayed cement compositions may comprise a primary set retarder. A broad variety of primary set retarders may be suitable for use in the set-delayed cement compositions. For example, the primary set retarder may comprise phosphonic acids, phosphonic acid derivatives such as methylene phosphonic acid, etc.; phosphonates such as methylene phosphonate, etc.; or mixtures thereof. Examples of suitable set retarders include, among others, methylene phosphonates. Specific examples of suitable set retarders are Dequest® 2006 additive and Dequest® 2066 additive. Dequest® 2006 additive and Dequest® 2066 additive are both available from Thermphos USA Corporation, Red Bank, N.J. Dequest® 2066 additive is a pH neutralized diethylenetriaminepentamethylenephosphonate. Dequest® 2006 additive is nitrilotrismethylenetriphosphonate (NTMP), illustrated in FIG. 1A. Generally, the primary set retarder may be present in the set-delayed cement compositions in an amount sufficient to delay the setting for a desired time. In some embodiments, the primary set retarder may be present in the set-delayed cement compositions in an amount in the range of from about 0.01% to about 10% by weight of the hydraulic cement. In specific embodiments, the primary set retarder may be present in an amount ranging between any of and/or including any of about 0.01%, about 0.1%, about 1%, about 2%, about 4%, about 6%, about 8%, or about 10% by weight of the hydraulic cement. One of ordinary skill in the art, with the benefit of this disclosure, will recognize the appropriate amount of primary set retarder to include for a chosen application.

Embodiments of the set-delayed cement compositions may include the activation of the set-delayed cement compositions via a retarder exchange. A retarder exchange is the exchange of a strong cement retarder for a weaker cement retarder that activates and shortens the set time (e.g. by removing barriers to hydration on the cement particle), however, in some embodiments the weaker cement retarder may still delay the setting of the hydraulic cement as compared to hydraulic cements that are free of the weaker cement retarder. For the purposes of this disclosure, the stronger cement retarders are referred to as "primary cement retarders" and the weaker cement retarders that exchange with the stronger cement retarders are referred to as "secondary retarders." Examples of suitable secondary retarders include, but are not limited to phosphates, phosphate derivatives, and combinations thereof. Phosphate derivatives include polyphosphates, polyphosphate derivatives, polyphosphate salts, polymeric phosphates, polymeric metaphosphates, salts of polymeric phosphates, salts of polymeric metaphosphates, and the like. A specific example is sodium hexametaphosphate (SHMP), illustrated in FIG. 1B. It is to be understood that although a secondary retarder may retard a cement system relative to an identical cement system that does not comprise the secondary retarder, a secondary retarder may not retard a cement system in all cases. The relative retardation effect of the secondary retarder may be specific to the cement system employed and the concentration of the secondary retarder used for a specific application. Therefore, although the term "secondary retarder" is used to refer to the compound that exchanges with the primary retarder, this term is not meant to indicate that the compound has a retarding effect in all cases. As such, the secondary retarder may not retard each and every cement system relative to identical versions of said cement systems that do not comprise the secondary retarder.

The secondary retarder should be added to embodiments of the set-delayed cement composition in an amount sufficient to activate the set-delayed cement composition to set into a hardened mass (i.e. in an amount sufficient to exchange with enough of the primary retarder such that the hydraulic cement is able to hydrate and consequently set). In certain embodiments, the secondary retarder may be added to the set-delayed cement composition in an amount in the range of about 0.1% to about 5% by weight of the hydraulic cement. In specific embodiments, the secondary retarder may be present in an amount ranging between any of and/or including any of about 0.1%, about 1%, about 2.5%, about 4%, or about 5% by weight of the hydraulic cement. One of ordinary skill in the art, with the benefit of this disclosure, will recognize the appropriate amount of secondary retarder to include for a chosen application.

Figure 1B:
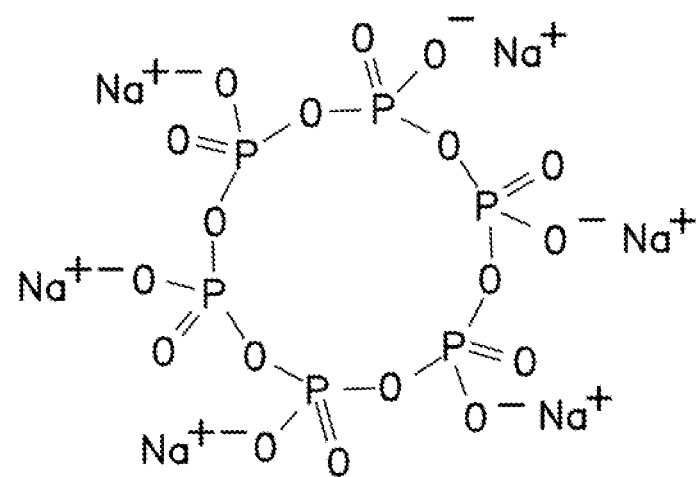
FIG. 1B illustrates the chemical structure of sodium hexametaphosphate (SHMP)

Without being limited by theory, and purely for informational purposes, the following is a possible explanation for the retarder exchange mechanism. It is believed that the phosphonate retarders such as NTMP function by forming a barrier to water on the surface of a hydraulic cement particle. The NTMP barrier should reduce the ability of water to hydrate the cement particle. A phosphate retarder such as SHMP may be used to activate the hydraulic cement. When sufficient SMHP is added to the retarded slurry, it is believed that the SHMP exchanges with NTMP on the surface of the cement particle. The exchange of SHMP for NTMP on the surface of a hydraulic cement particle allows for the hydration of the cement particle. The SMHP may serve as a retarder for the hydraulic cement and delay the setting of the hydraulic cement as compared to hydraulic cement that is free of SHMP or NTMP. However, the hydraulic cement may still be able to set despite the inclusion of SHMP because SHMP is a milder retarder than NTMP. In this specific embodiment, SHMP is able to function as both a retarder and a cement set activator, because it activates and reduces the set time of the NTMP inhibited hydraulic cement, but nonetheless delays the set time of the hydraulic cement as compared to a hydraulic cement that is free of SHMP. The molecular structures of NTMP and SHMP are shown in FIGS. 1A and 1B.

Figure 2:
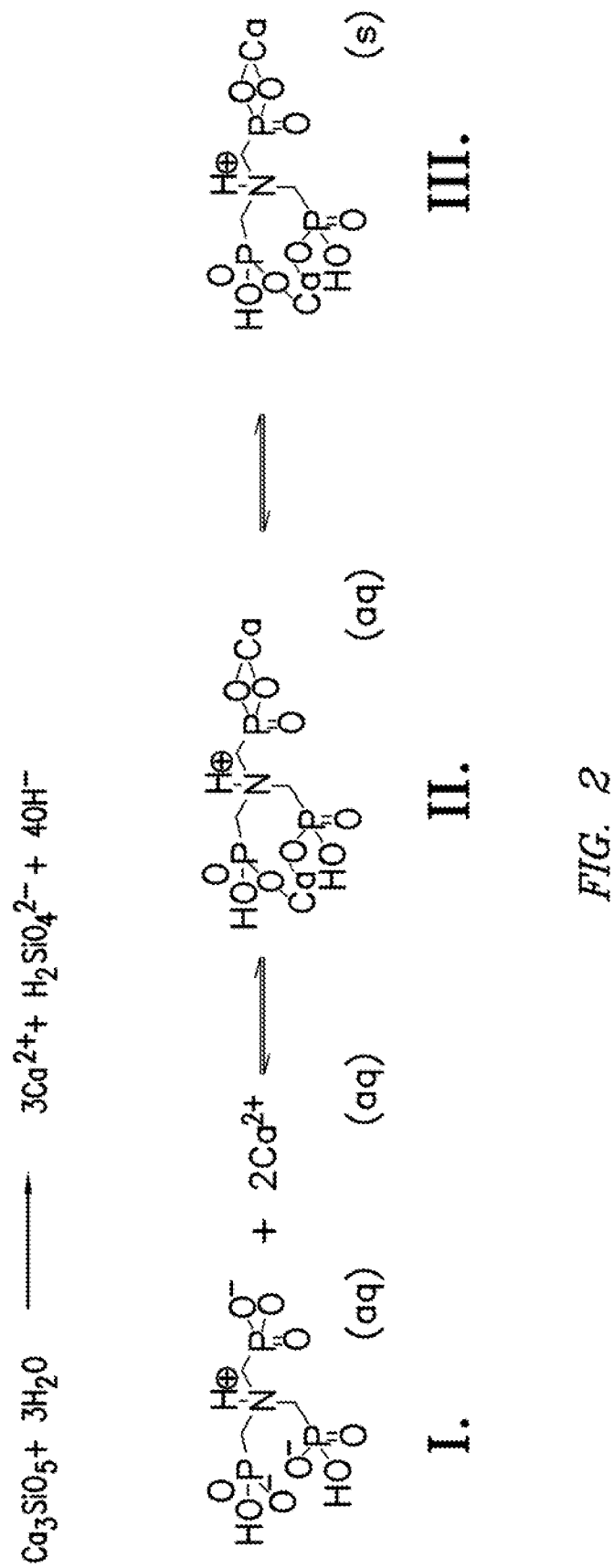
FIG. 2 illustrates an example of the dynamics of dissolution and precipitation of calcium through the induction of NTMP to calcium ion.

The mechanism of NTMP cement retardation (in the absence of SHMP) is known in the art. Calcium ion released from the dissolution of the hydraulic cement forms a transiently soluble complex with the phosphonate. After a short period of time, the calcium phosphonate complex oligomerizes and precipitates. This precipitate then covers the surface of the cement particles and inhibits cement hydration by becoming a nucleation inhibitor and creating a barrier to water diffusion. The mechanism of NTMP retardation is known as the dissolution-precipitation mechanism and it is illustrated in FIG. 2.

Figure 3:
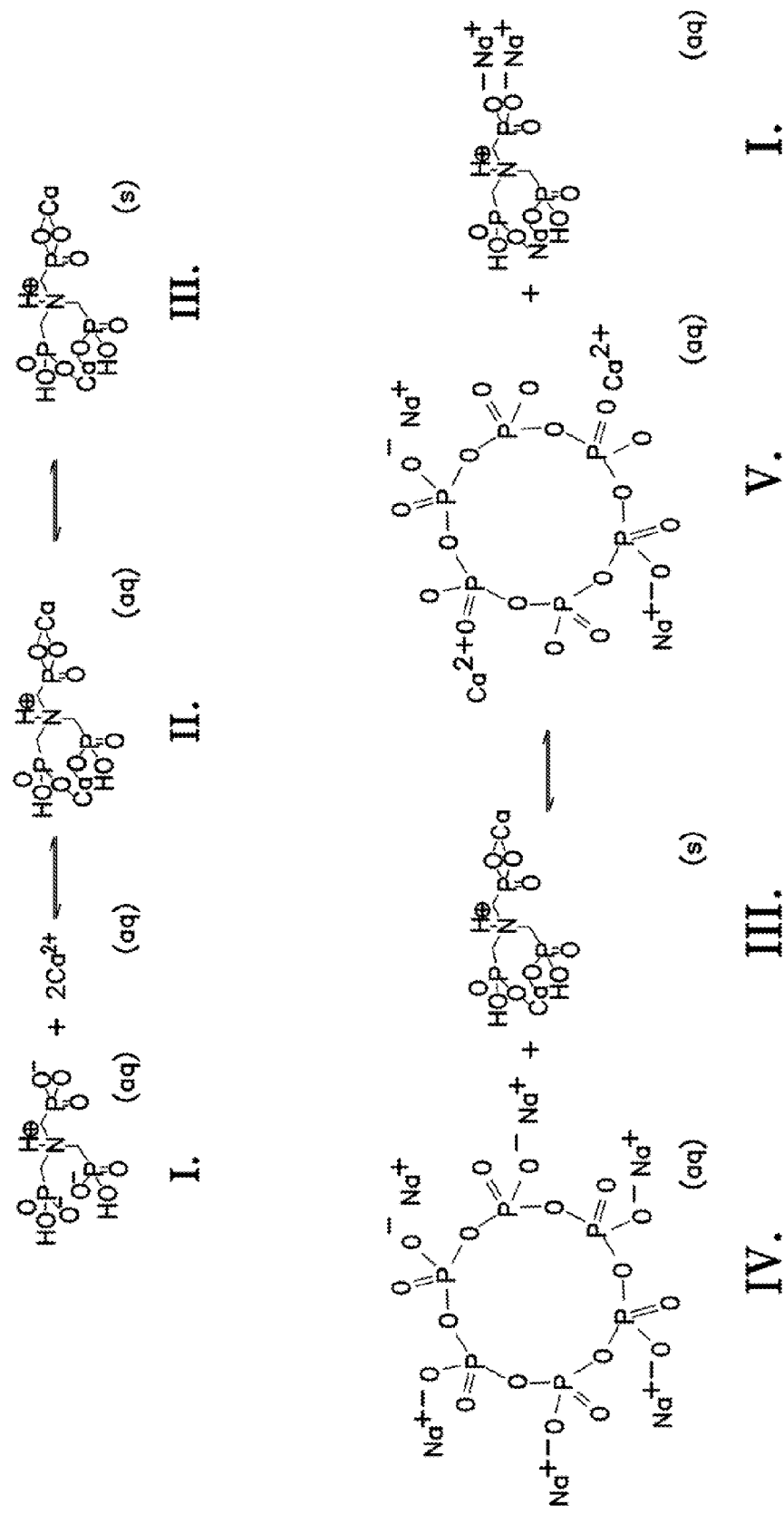
FIG. 3 illustrates an example of the exchange dynamics of NTMP and SHMP as ligands on calcium.
Figure 4:
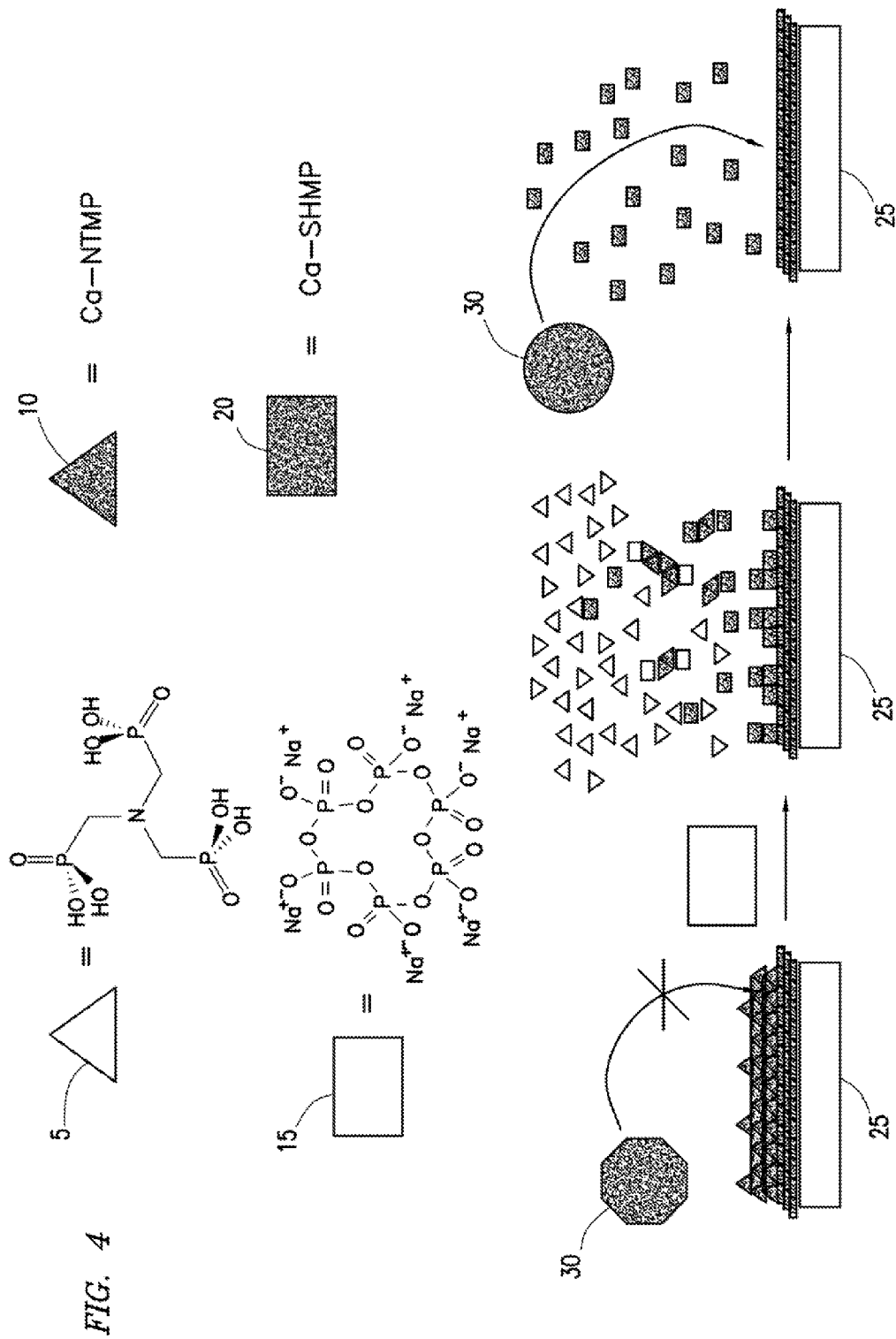
FIG. 4 illustrates an example of a retarder exchange reaction.

SHMP competes with NTMP for calcium. Without being limited by theory, the substitution of NTMP for SHMP may be envisioned through a series of dynamic chemical equilibria which are illustrated in FIG. 3. Without being limited by theory, it is believed that the phosphate-phosphonate retarder exchange enables the activation of a hydraulic cement slurry retarded with phosphonates by introducing a dissolution step for the precipitated calcium (III). The formation of compound V in FIG. 3 lifts the physical barrier to water diffusion to the cement particles and allows cement hydration to begin. The resulting phosphate complex from the retarder exchange reaction is water soluble (as opposed to the NTMP-calcium complex which has limited water solubility) and thus changes the dynamics of the cement by redissolving calcium. This final dissolution step activates the cement and allows the retarding effect of NTMP to be effectively bypassed. A visual overview of the entire process is illustrated in FIG. 4. As described in FIG. 4, NTMP 5 is represented by the clear triangle and the Ca-NTMP complex 10 is represented by the full triangle. SHMP 15 is represented by the clear square and the Ca-SHMP complex 20 is represented by the full square. In embodiments, the Ca-NTMP complex 10 precipitates onto the surface of the cement particle 25 and prohibits water 30 from contacting the surface of the cement particle 25. The addition of SHMP 15 results in an exchange of calcium from the Ca-NTMP complex 10 to the SHMP 15 to produce the Ca-SHMP complex 20 and free NTMP 5. The Ca-SHMP complex 20 disperses and is solvated in the surrounding water 30 due to its high water solubility. Therefore, there should no longer be a barrier for the water 30 to hydrate the cement particle 25. In embodiments, once the cement has been activated with sodium hexametaphosphate, the cement can be further accelerated through the addition of a known accelerator, such as calcium chloride or nanosilica.

Embodiments of the set-delayed cement compositions may comprise a cement set accelerator. Examples of suitable cement set accelerators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); and combinations thereof.

Where used, the cement set accelerator may be added to embodiments of the set-delayed cement composition in an amount sufficient to accelerate the setting of the set-delayed compositions. The cement set accelerator may be added to the set-delayed cement compositions prior to, during, or after activation. In certain embodiments, the cement set accelerator may be added to the cement composition in an amount in the range of about 0.1% to about 20% by weight of the pozzolan. In specific embodiments, the cement set accelerator may be present in an amount ranging between any of and/or including any of about 0.1%, about 1%, about 5%, about 10%, about 15%, or about 20% by weight of the pozzolan. One of ordinary skill in the art, with the benefit of this disclosure, will recognize the appropriate amount of the cement set accelerator to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; Ethacryl™ G dispersant available from Coatex, Genay, France; sulfonated napthalenes; or sulfonated formaldehyde. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water.

In some embodiments, the dispersant may be included in the set-delayed cement compositions in an amount in the range of from about 0.01% to about 5% by weight of the hydraulic cement. In specific embodiments, the dispersant may be present in an amount ranging between any of and/or including any of about 0.01%, about 0.1%, about 0.5%, about 1%, about 2%, about 3%, about 4%, or about 5% by weight of the hydraulic cement. One of ordinary skill in the art, with the benefit of this disclosure, will recognize the appropriate amount of the dispersant to include for a chosen application.

Some embodiments of the set-delayed cement compositions may comprise silica sources in addition to the hydraulic cement; for example, crystalline silica and/or amorphous silica. Crystalline silica is a powder that may be included in embodiments of the set-delayed cement compositions, for example, to prevent cement compressive strength retrogression. Amorphous silica is a powder that may be included in embodiments of the set-delayed cement compositions as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. An example of a suitable source of amorphous silica is Silicalite™ cement additive available from Halliburton Energy Services, Inc., Houston, Tex. Embodiments comprising additional silica sources may utilize the additional silica source as needed to enhance compressive strength or set times.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions generally should have a density suitable for a particular application. By way of example, the cement compositions may have a density in the range of from about 4 pounds per gallon ("lb/gal") to about 20 lb/gal. In certain embodiments, the cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storage, but prior to placement in a subterranean formation. In embodiments, weighting additives may be used to increase the density of the set-delayed cement compositions. Examples of suitable weighting additives may include barite, hematite, hausmannite, calcium carbonate, siderite, ilmenite, or combinations thereof. In particular embodiments, the weighting additives may have a specific gravity of about 3 or greater. Those of ordinary skill in the art, with the benefit of this disclosure, will recognize the appropriate density for a particular application.

As previously mentioned, the set-delayed cement compositions may have a delayed set in that they remain in a pumpable fluid state for at least one day (e.g., at least about 1 day, about 2 weeks, about 2 years or more) at ambient temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by retarder exchange) to set into a hardened mass. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

As will be appreciated by those of ordinary skill in the art, embodiments of the set-delayed cement compositions may be used in a variety of subterranean operations, including primary and remedial cementing. In some embodiments, a set-delayed cement composition may be provided that comprises water, a hydraulic cement, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition.

In some embodiments, a set-delayed cement composition may be provided that comprises water, a hydraulic cement, and a primary set retarder. The set-delayed cement composition may further comprise any additive or combination of additives discussed herein. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, introduced into a subterranean formation, and allowed to set therein. As previously described, activation of the set-delayed cement composition may include addition of a secondary set retarder for exchange with the primary retarder.

In primary cementing embodiments, for example, the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

An embodiment comprises a method of cementing comprising: providing a set-delayed cement composition comprising: a hydraulic cement, water, and a primary retarder; activating the set-delayed cement composition through a retarder exchange whereby a secondary retarder is added to the set-delayed cement composition to produce an activated cement composition; and allowing the activated cement composition to set.

An embodiment comprises activated cement composition comprising: a hydraulic cement, water, a phosphonate retarder, and a phosphate retarder.

An embodiment comprises a system for cementing comprising: a set delayed cement composition comprising: a hydraulic cement, water, and a primary retarder at least partially disposed on the hydraulic cement to reduce the ability of water to hydrate the hydraulic cement; a secondary retarder to exchange with the primary retarder on the hydraulic cement and activate the set-delayed cement composition; mixing equipment for mixing the set-delayed cement composition and the secondary retarder to form an activated cement composition; and pumping equipment for delivering the activated cement composition into a wellbore.

Figure 5:
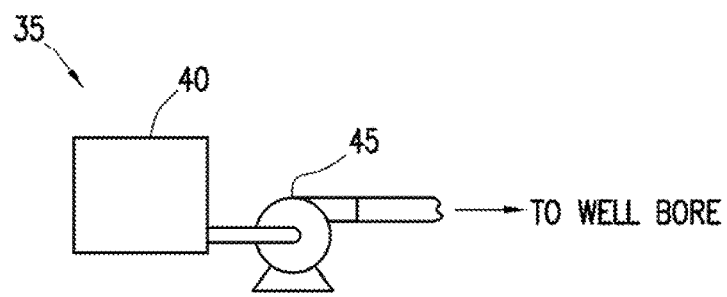
FIG. 5 illustrates a system for preparation and delivery of a set-delayed cement composition to a wellbore in accordance with certain embodiments.

Referring now to FIG. 5, preparation of a set-delayed cement composition in accordance with example embodiments will now be described. FIG. 5 illustrates a system 35 for preparation of a set-delayed cement composition and delivery to a wellbore in accordance with certain embodiments. As shown, the set-delayed cement composition may be mixed in mixing equipment 40, such as a jet mixer, re-circulating mixer, or a batch mixer, for example, and then pumped via pumping equipment 45 to the wellbore. In some embodiments, the mixing equipment 40 and the pumping equipment 45 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the secondary retarder may be added to the mixer as a powder or as an aqueous liquid prior to pumping the cement composition downhole.

Figure 6A:
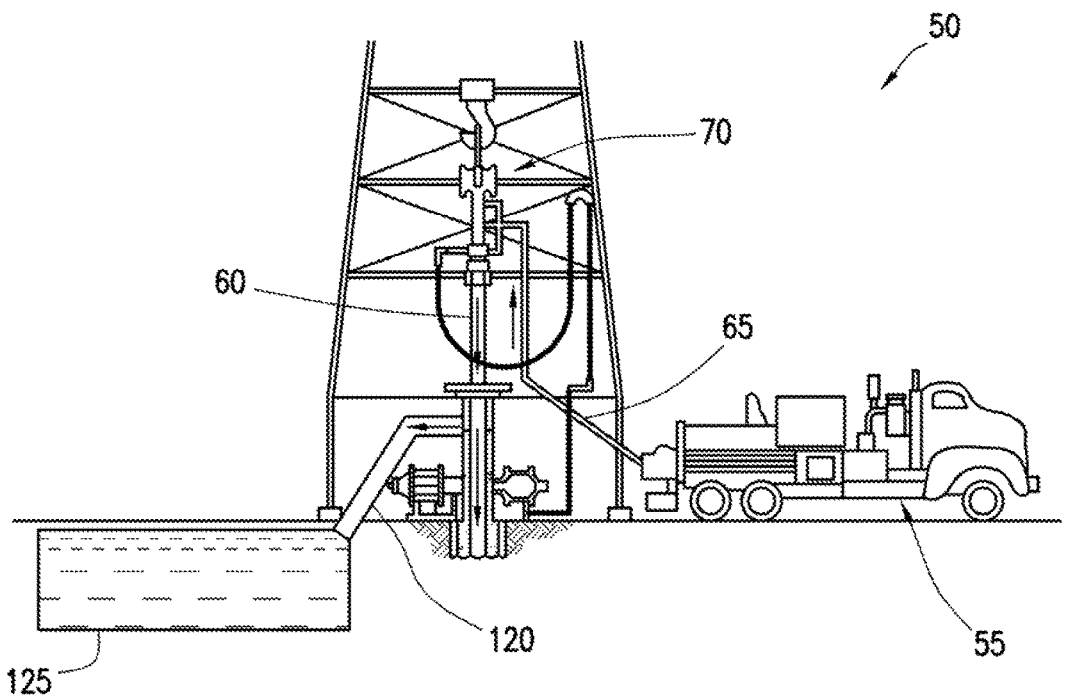
FIG. 6A illustrates surface equipment that may be used in placement of a set-delayed cement composition in a wellbore in accordance with certain embodiments.

An example technique for placing a set-delayed cement composition into a subterranean formation will now be described with reference to FIGS. 6A and 6B. FIG. 6A illustrates surface equipment 50 that may be used in placement of a set-delayed cement composition in accordance with certain embodiments. It should be noted that while FIG. 6A generally depicts a land-based operation, those skilled in the art will readily recognize that the principles described herein are equally applicable to subsea operations that employ floating or sea-based platforms and rigs, without departing from the scope of the disclosure. As illustrated by FIG. 6A, the surface equipment 50 may include a cementing unit 55, which may include one or more cement trucks. The cementing unit 55 may include mixing equipment 40 and pumping equipment 45 (e.g., FIG. 5) as will be apparent to those of ordinary skill in the art. The cementing unit 55 may pump a set-delayed cement composition 60 through a feed pipe 65 and to a cementing head 70 which conveys the set-delayed cement composition 60 downhole.

Figure 6B:
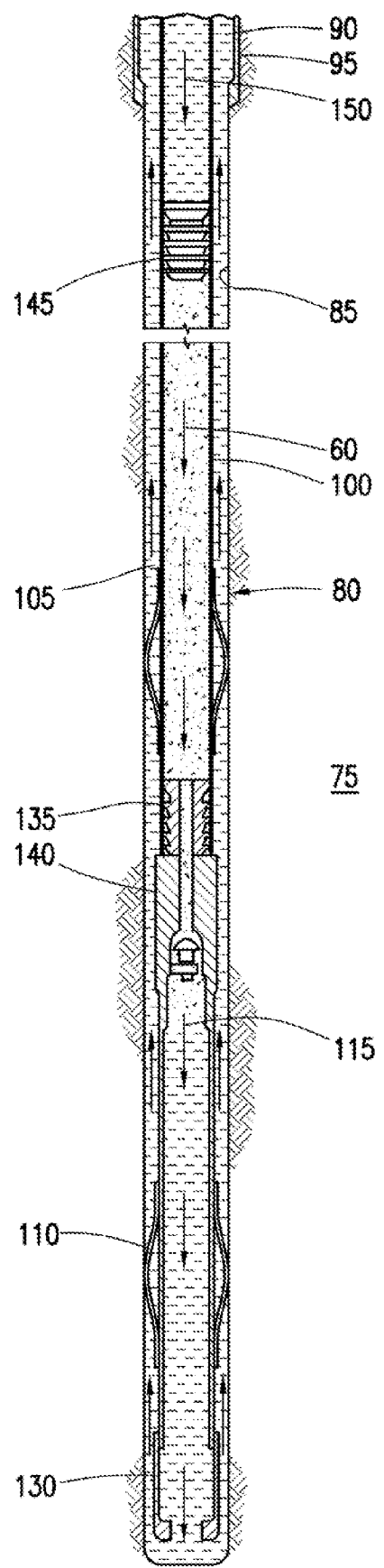
FIG. 6B illustrates placement of a set-delayed cement composition into a wellbore annulus in accordance with certain embodiments.

Turning now to FIG. 6B, the set-delayed cement composition 60 may be placed into a subterranean formation 75 in accordance with example embodiments. As illustrated, a wellbore 80 may be drilled into the subterranean formation 75. While wellbore 80 is shown extending generally vertically into the subterranean formation 75, the principles described herein are also applicable to wellbores that extend at an angle through the subterranean formation 75, such as horizontal and slanted wellbores. As illustrated, the wellbore 80 comprises walls 85. In the illustrated embodiment, a surface casing 90 has been inserted into the wellbore 80. The surface casing 90 may be cemented to the walls 85 of the wellbore 80 by cement sheath 95. In the illustrated embodiment, one or more additional conduits (e.g., intermediate casing, production casing, liners, etc.), shown here as casing 100 may also be disposed in the wellbore 80. As illustrated, there is a wellbore annulus 105 formed between the casing 100 and the walls 85 of the wellbore 80 and/or the surface casing 90. One or more centralizers 110 may be attached to the casing 100, for example, to centralize the casing 100 in the wellbore 80 prior to and during the cementing operation.

With continued reference to FIG. 6B, the set-delayed cement composition 60 may be pumped down the interior of the casing 100. The set-delayed cement composition 60 may be allowed to flow down the interior of the casing 100 through the casing shoe 130 at the bottom of the casing 100 and up around the casing 100 into the wellbore annulus 105. The set-delayed cement composition 60 may be allowed to set in the wellbore annulus 105, for example, to form a cement sheath that supports and positions the casing 100 in the wellbore 80. While not illustrated, other techniques may also be utilized for introduction of the set-delayed cement composition 60. By way of example, reverse circulation techniques may be used that include introducing the set-delayed cement composition 60 into the subterranean formation 75 by way of the wellbore annulus 105 instead of through the casing 100.

As it is introduced, the set-delayed cement composition 60 may displace other fluids 115, such as drilling fluids and/or spacer fluids that may be present in the interior of the casing 100 and/or the wellbore annulus 105. At least a portion of the displaced fluids 115 may exit the wellbore annulus 105 via a flow line 120 and be deposited, for example, in one or more retention pits 125 (e.g., a mud pit), as shown on FIG. 6A. Referring again to FIG. 6B, a bottom plug 135 may be introduced into the wellbore 80 ahead of the set-delayed cement composition 60, for example, to separate the set-delayed cement composition 60 from the fluids 115 that may be inside the casing 100 prior to cementing. After the bottom plug 135 reaches the landing collar 140, a diaphragm or other suitable device should rupture to allow the set-delayed cement composition 60 through the bottom plug 135. In FIG. 6B, the bottom plug 135 is shown on the landing collar 140. In the illustrated embodiment, a top plug 145 may be introduced into the wellbore 80 behind the set-delayed cement composition 60. The top plug 145 may separate the set-delayed cement composition 60 from a displacement fluid 150 and also push the set-delayed cement composition 60 through the bottom plug 135.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of certain aspects of some embodiments are given. In no way should the following examples be read to limit, or define, the entire scope of the embodiments.

Example 1

Figure 7:
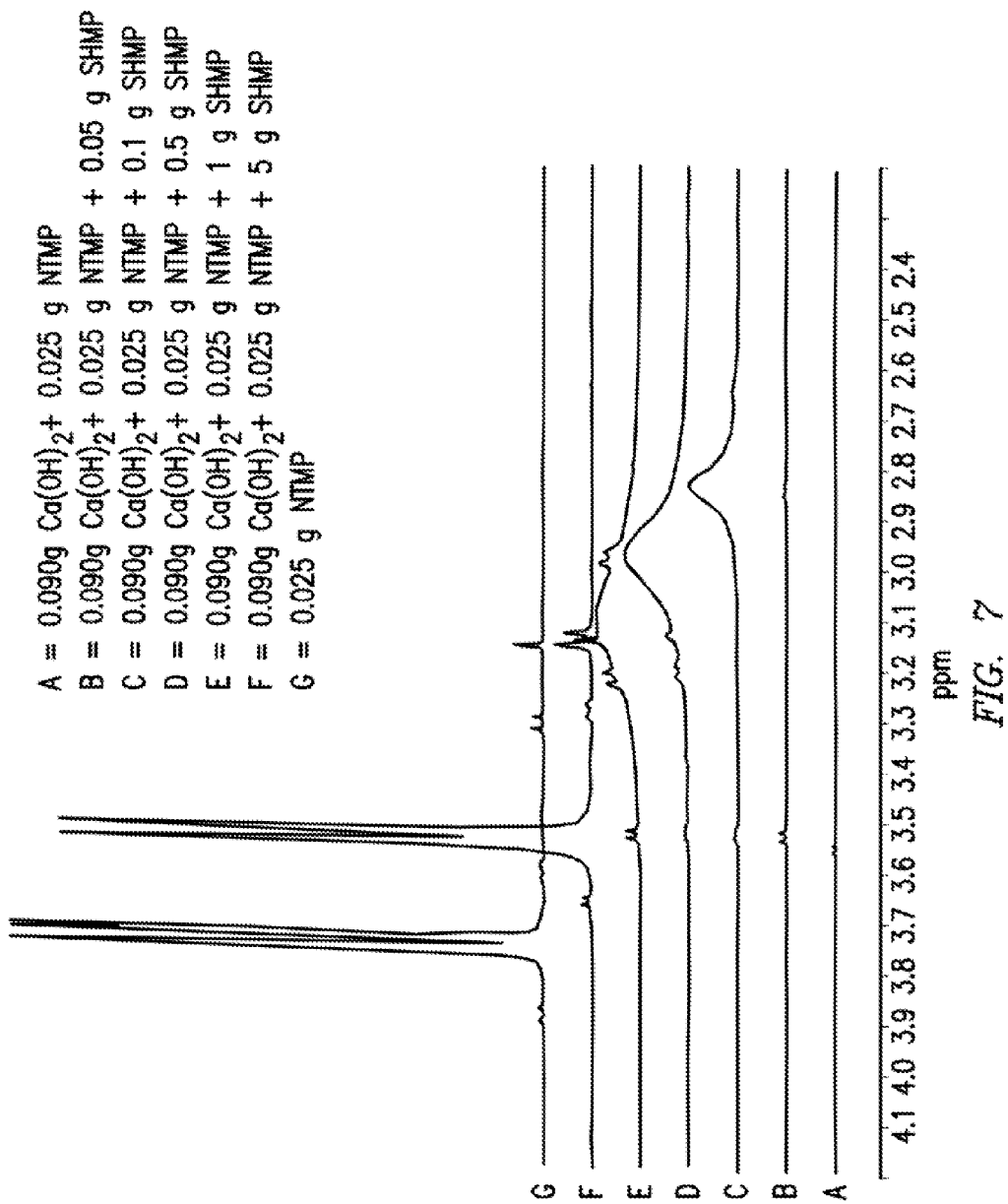
FIG. 7 illustrates the $^1$H NMR Spectra for the different ratios of SHMP to NTMP.

The effect of different concentrations of SHMP relative to NTMP in an aqueous $Ca(OH)_2$ solution was monitored by $^1H$ NMR (FIG. 7). $^1H$ and $^{31}P$ coupling NMR analyses was performed using a Bruker Ultrashield 500 plus equipped with a 5 mm broadband probe for both $^1H$ and $^{31}P$ analysis. $^1H$ NMR analysis was performed using a water suppression pulse program. The acquisition time was 2.048 seconds with a relaxation delay set at 2 seconds. The sweep width was 8000 Hz. 450 scans were taken of each sample. Trimethylsilyl propanoic acid (TMSP) in $D_2O$ was used as the reference peak at 0 ppm. $^{31}P$ coupling NMR spectra were acquired in order to identify the origin of the phosphorous signals. The acquisition time was 0.402 seconds with a relaxation delay of 2 seconds and sweep width of 81521 Hz. All spectra were collected over 740 scans. Calcium hydroxide, deuterium oxide, SHMP, and NTMP were acquired from Sigma-Aldrich, St. Louis, Mo. The NTMP was provided as an aqueous solution with 50% activity. Its dosage was converted to total solid content in the following examples. API Class H cement was obtained from Lafarge Co., Joppa cement plant, Grand Chain, Ill. Eight different samples of $Ca(OH)_2$, NTMP, and SHMP were prepared in 10 mL of $D_2O$ containing 0.05% TMSP by weight. The composition makeups are shown in Table 1 below.

TABLE 1

Compositional Makeup for NMR Experiments.

| Sample | SHMP (g) | $Ca(OH)_2$ (g) | NTMP (g) |
|---|---|---|---|
| A | 0 | 0.090 | 0.025 |
| B | 0.050 | 0.090 | 0.025 |
| C | 0.100 | 0.090 | 0.025 |
| D | 0.500 | 0.090 | 0.025 |
| E | 1.0 | 0.090 | 0.025 |
| F | 5.0 | 0.090 | 0.025 |
| G | 0 | 0 | 0.25 |

Figure 8:
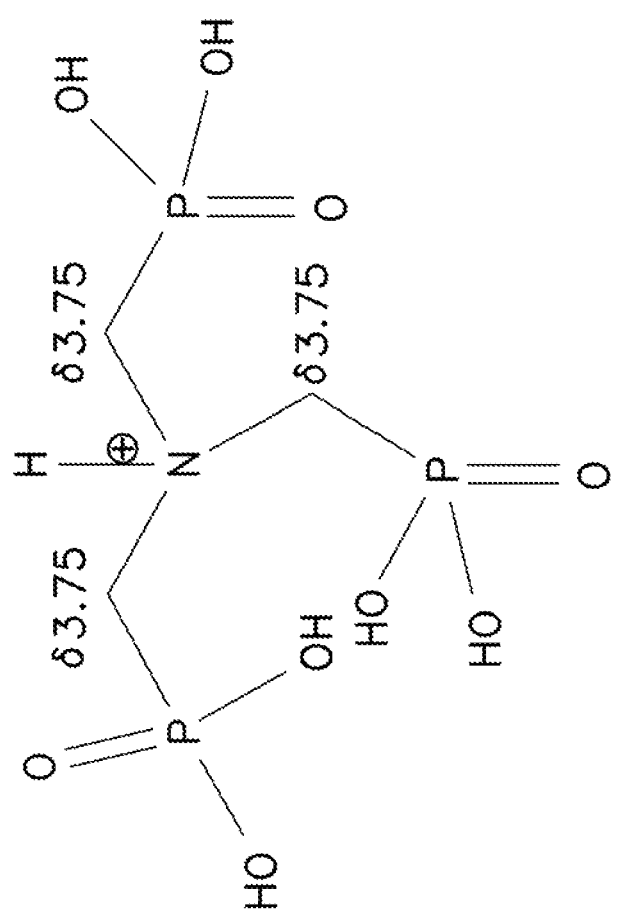
FIG. 8 illustrates the $^1$H NMR chemical shift assignment of the methylene groups on the structure on NTMP.

The results of this experiment are shown in FIG. 7. The results illustrate that increasing the amount of SHMP relative to NTMP renders a chemical shift similar to free NTMP (without $Ca^{2+}$). This indicates that SHMP has successfully competed with NTMP to bind calcium. The peak for the methylene (—$CH_2$) functional group of NTMP (FIG. 8) was used as the monitor signal. The chemical shift of NTMP at the —$CH_2$ functional group is around 3.75 ppm (doublet) as seen in spectrum G of FIG. 7.

The $^1H$ NMR experiments suggest that once sufficient SHMP is added to the Ca-NTMP complex in solution, the NTMP signal of free NTMP (without calcium binding) returns. As can be seen in FIG. 7, the methylene peak becomes sharper and the chemical shift closer to pure NTMP when more SHMP is added to the solution with the Ca-NTMP complex. When no SHMP is added to the Ca-NTMP (Spectrum A of FIG. 7), no NMR signal is observed for the methylene peak. This may be because the complex has precipitated out of solution. As SHMP is added (Spectrum B to E of FIG. 7), a broad peak appears and is observed to shift downfield toward the chemical shift of free NTMP. The broadening of the peak may be due to the size of the supramolecular Ca(NTMP)(SHMP) entity. When an excess amount of SHMP is added to the mixture (5 grams of SHMP), the NTMP signal is observed at 3.55 ppm (Spectrum F of FIG. 7).

Figure 9:
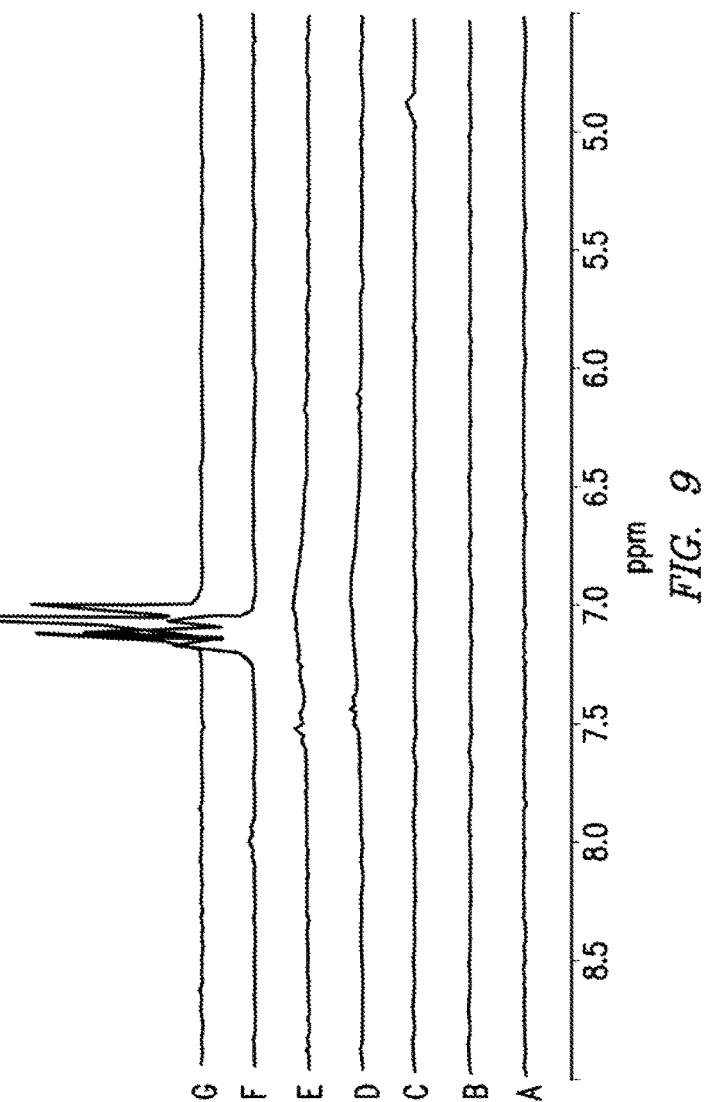
FIG. 9 illustrates the $^{31}$P coupling NMR spectra of SHMP to NTMP.

The 31P chemical shift of pure NTMP is around 7.2 ppm (triplet). As with the $^1H$-NMR results, a broad peak appears when a relatively low concentration of SHMP (0.5-1 grams) is added (FIG. 9, spectra D-E). When sufficient SHMP (5 grams) is added, however, the $^{31}P$ signal moves closer to that of pure NTMP as shown in FIG. 9, spectrum F. This suggests the ligand exchange between NTMP and SHMP described in FIG. 3 has occurred. The exchange of NTMP with SHMP increases the water solubility of calcium which in turn removes the physical barrier to hydration in the cement slurry.

Example 2

Figure 10:
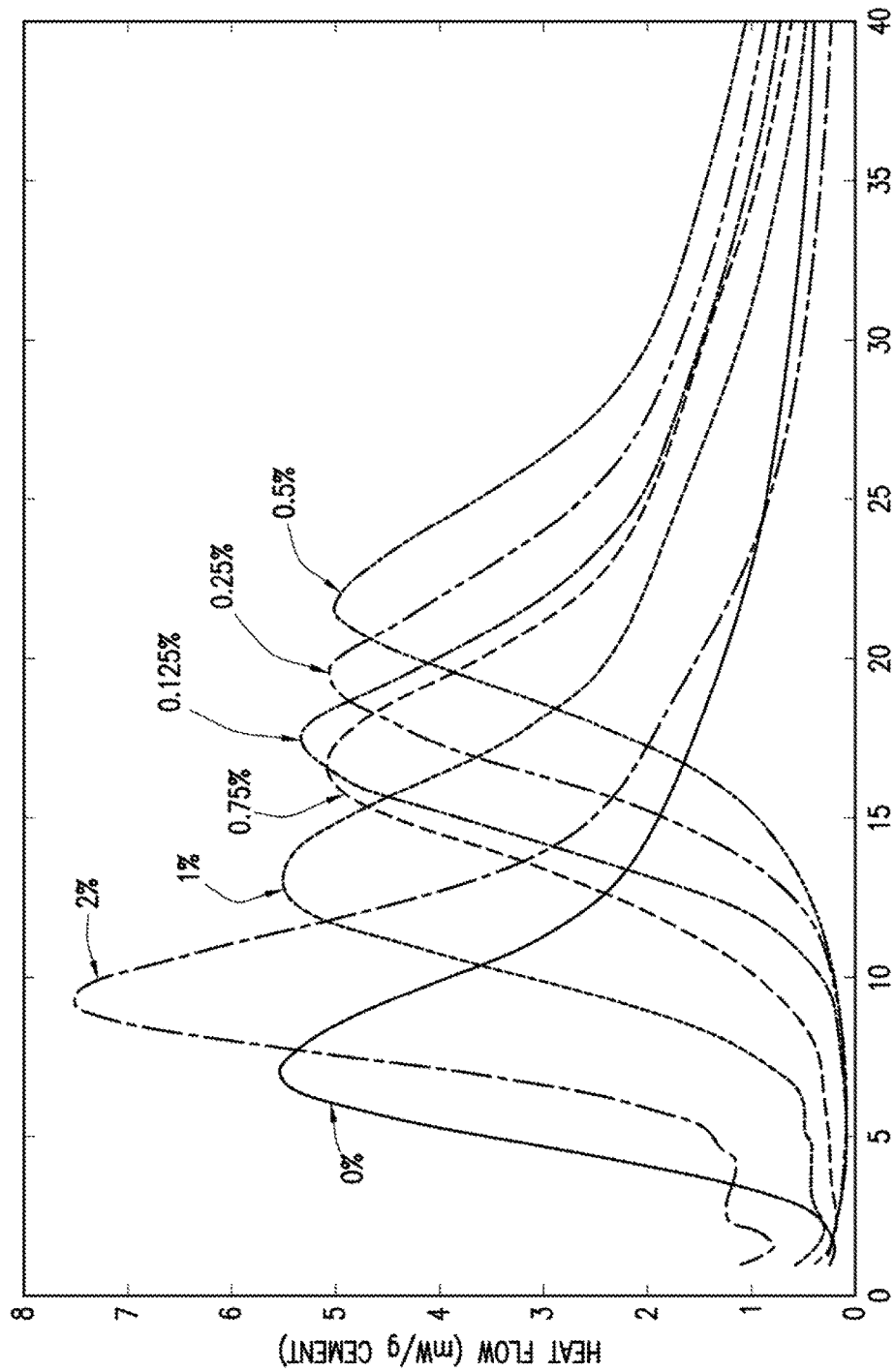
FIG. 10 illustrates the hydration kinetics of Class H cement with different dosages of SHMP at 100° F.

Isothermal calorimetry measurements were performed to evaluate the individual effect of SHMP on the hydration kinetics of Portland cement. Seven samples were prepared. For each design, 450 grams of cement was used to generate a final slurry volume of about 300 mL. Each sample comprised 38% water by weight of the cement. The amount of SHMP varied from 0%, 0.125%, 0.25%, 0.50%, 0.75%, 1%, to 2% by weight of the cement. Approximately 5.6 grams cement slurry sample was used for the isothermal calorimetry test. All calorimetry test data were truncated at 1 hour after introducing the sample to the calorimeter. Results are illustrated in FIG. 10. The control class H cement had an induction period (a period of inactivity before the main hydration begins) of about 2.5 hours. The addition of SHMP appears to retard cement hydration. At lower dosages (<0.5%), the induction period increases slightly with increasing SHMP. At higher dosages (>0.5%), the induction period decreases with increasing SHMP. The induction period was estimated to be approximately 11, 12, 13, 8.5, 6, and 5 hours, for SHMP dosages of 0.125%, 0.25%, 0.5%, 0.75%, 1%, and 2%, respectively. The heat flow rate during the induction period appears to be largely independent of SHMP at lower dosages (<0.5%), but increases significantly with SHMP at higher dosages (>0.5%) as seen in FIG. 10.

Example 3

Figure 11:
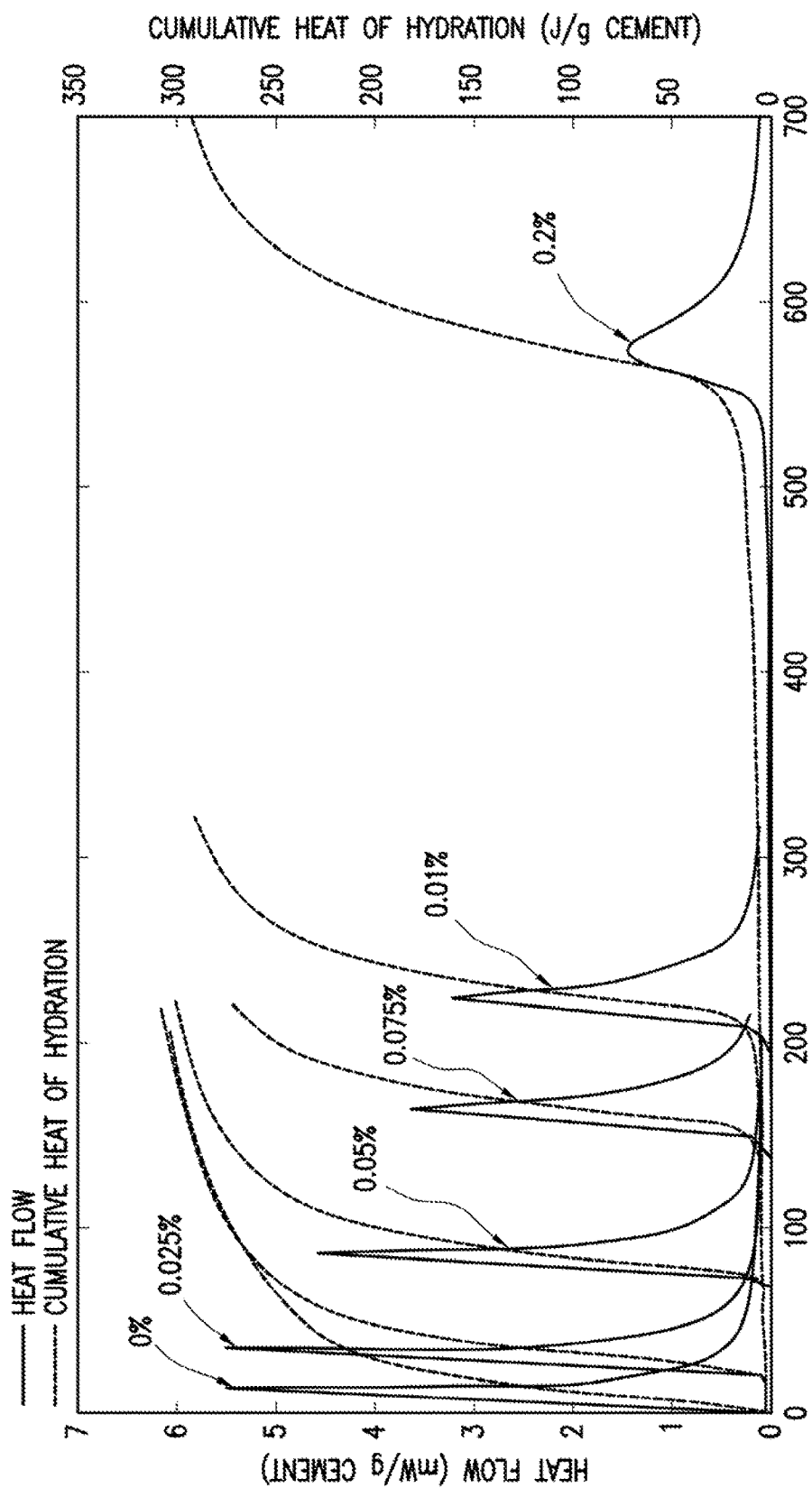
FIG. 11 illustrates the hydration kinetics of Class H cement with different dosages of NTMP at 100° F.

Isothermal calorimetry measurements were also performed to evaluate the individual effect of NTMP on the hydration kinetics of Portland cement. Six samples were prepared. As with the SHMP experiments, for each design, 450 grams of cement was used to generate a final slurry volume of about 300 mL. Each sample comprised 38% water by weight of the cement. The amount of NTMP varied from 0%, 0.25%, 0.50%, 0.75%, 1%, to 2% by weight of the cement. Approximately 5.6 grams cement slurry sample was used for the isothermal calorimetry test. The data were truncated at 1 hour after introducing the sample to the calorimeter. The results are illustrated in FIG. 11.

Example 4

The mixture designs for the exchange of NTMP with SHMP in Portland cement hydration are shown in Table 2. As with the SHMP and NTMP experiments, for each design, 450 grams of cement was used to generate a final slurry volume of about 300 mL. Approximately 5.6 grams cement slurry sample was used for the isothermal calorimetry test. All cement slurries were initially mixed with NTMP only. SHMP was added to the slurry a few minutes later. The results are shown in Table 3 below.

TABLE 2

Slurry design for the combined effects of NTMP and SHMP on cement hydration

| | NTMP | | | | | | | |
|---|---|---|---|---|---|---|---|---|
| | 0.05% | | | | | 0.20% | | |
| Water | 38% | 38% | 38% | 38% | 38% | 38% | 38% | 38% |
| Cement | 100% | 100% | 100% | 100% | 100% | 100% | 100% | 100% |
| SHMP | 0.125% | 0.25% | 0.50% | 1.00% | 2.00% | 0.50% | 1.00% | 2.00% |

TABLE 3

Variation of induction period (hours) of cement hydration with different dosages of NTMP and SHMP

| NTMP Dosage | SHMP Dosage | | | | | |
|---|---|---|---|---|---|---|
| | 0% | 0.125% | 0.25% | 0.50% | 1.00% | 2.00% |
| 0% | 2.5 | 11 | 12 | 13 | 6 | 5 |
| 0.05% | 74 | 40 | 18 | 13 | 7 | 5 |
| 0.2% | 548 | — | — | 38 | 10 | 7 |

From Example 3, we know that 0.05% NTMP renders a cement slurry with an induction period of about 74 hours. The results showed that adding different amounts of SHMP to the slurry reduces the induction period proportionately to the amount of SHMP that is added. For example, adding 0.125% SHMP, reduces the induction period to about 40 hours. As another example, the addition of 1% SHMP produces a slurry with about a 7 hour induction period.

When the amount of SHMP is in great excess of the amount of NTMP, the induction period becomes similar to and sometimes the same as the induction period without any NTMP. The SHMP in this case dominates the hydration kinetics in the cement. For instance, when 0.5% SHMP is used to activate a slurry with 0.2% NTMP, the induction period is 38 hours. Recall that the base slurry (FIG. 11) has an induction period of about 548 hours. When only 0.05% NTMP retards the cement initially, the addition of 0.5% SHMP results in exactly the same induction period as 0.5% SHMP in the absence of NTMP (i.e. 13 hours), such that NTMP no longer has a retarding effect on the slurry.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of cementing comprising:
   providing a set-delayed cement composition comprising:
   a hydraulic cement,
   water, and
   a primary retarder;
   activating the set-delayed cement composition through a retarder exchange whereby a secondary retarder is added to the set-delayed cement composition to produce an activated cement composition; and
   allowing the activated cement composition to set.

2. The method of claim 1 wherein the hydraulic cement comprises Portland cement.

3. The method of claim 1 wherein the primary retarder comprises a phosphonate.

4. The method of claim 1 wherein the primary retarder comprises nitrilotrismethylenetriphosphonate.

5. The method of claim 1 wherein the primary retarder is present in an amount between about 0.01% to about 10% by weight of the hydraulic cement.

6. The method of claim 1 wherein the secondary retarder comprises a phosphate.

7. The method of claim 1 wherein the secondary retarder comprises sodium hexametaphosphate.

8. The method of claim 1 wherein the secondary retarder is present an amount between about 0.1% to about 5% by weight of the hydraulic cement.

9. The method of claim 1 wherein the set-delayed cement composition further comprises at least one dispersant, wherein the at least one dispersant is selected from the group consisting of a sulfonated-formaldehyde-based dispersant, a polycarboxylated ether dispersant, and any combination thereof.

10. The method of claim 1 wherein the primary retarder comprises nitrilotrismethylenetriphosphonate, the secondary retarder comprises sodium hexametaphosphate, and the set-delayed cement composition further comprises a polycarboxylated dispersant.

11. The method of claim 1 wherein the set-delayed cement composition further comprises at least one additive selected from the group consisting of a cement set accelerator, a silica source, a weighting agent, a lightweight additive, a gas-generating additive, a mechanical-property-enhancing additive, a lost-circulation material, a filtration-control additive, a fluid-loss-control additive, defoaming agent, a foaming agent, a thixotropic additive, and any combination thereof.

12. The method of claim 1 further comprising storing the set-delayed cement composition for a period of about 1 day or longer prior to the step of activating.

13. The method of claim 1 further comprising introducing the activated cement composition into a subterranean formation.

14. The method of claim 1 further comprising pumping the activated cement composition through a conduit, through a casing shoe, and into a wellbore annulus.

15. A set-delayed cement composition comprising:
   a hydraulic cement,
   water,
   a phosphonate retarder, and
   a phosphate retarder.

16. The composition of claim 15 wherein the hydraulic cement comprises Portland cement.

17. The composition of claim 15 wherein the phosphonate retarder comprises nitrilotrismethylenetriphosphonate, and wherein the phosphonate retarder is present in an amount of about 0.01% to about 10% by weight of the hydraulic cement.

18. The composition of claim 15 wherein the phosphate retarder comprises sodium hexametaphosphate, and wherein the phosphate retarder is present in an amount between about 0.1% to about 5% by weight of the hydraulic cement.

19. A system for cementing comprising:
   a set delayed cement composition comprising:
   a hydraulic cement,
   water, and
   a primary retarder at least partially disposed on the hydraulic cement to reduce the ability of water to hydrate the hydraulic cement;

a secondary retarder to exchange with the primary retarder on the hydraulic cement and activate the set-delayed cement composition;

mixing equipment for mixing the set-delayed cement composition and the secondary retarder to form an activated cement composition; and pumping equipment for delivering the activated cement composition into a wellbore.

20. The system of claim 19 wherein the primary retarder comprises a phosphonate retarder, and wherein the secondary retarder comprises a phosphate retarder.

* * * * *